US 8,660,186 B2

(12) United States Patent
Lee et al.

(10) Patent No.: US 8,660,186 B2
(45) Date of Patent: Feb. 25, 2014

(54) VIDEO FRAME ENCODING TRANSMITTER, ENCODING METHOD THEREOF AND OPERATING METHOD OF VIDEO SIGNAL TRANSMITTING AND RECEIVING SYSTEM INCLUDING THE SAME

(75) Inventors: Sang-Youn Lee, Seoul (KR); Jaehong Park, Seongnam-si (KR); Sanghoon Lee, Seoul (KR); Youngduk Kim, Hwaseong-si (KR)

(73) Assignee: Samsung Electronics Co., Ltd., Suwon-Si, Gyeonggi-Do (KR)

( * ) Notice: Subject to any disclaimer, the term of this patent is extended or adjusted under 35 U.S.C. 154(b) by 333 days.

(21) Appl. No.: 13/242,294

(22) Filed: Sep. 23, 2011

(65) Prior Publication Data

US 2012/0170655 A1    Jul. 5, 2012

(30) Foreign Application Priority Data

Dec. 29, 2010   (KR) ........................ 10-2010-0138073

(51) Int. Cl.
  *H04N 7/12*        (2006.01)
(52) U.S. Cl.
  USPC .................................................... 375/240.16
(58) Field of Classification Search
  USPC ................. 382/240, 236; 375/240.25, 240.26
  See application file for complete search history.

(56) References Cited

U.S. PATENT DOCUMENTS

| | | | |
|---|---|---|---|
| 2006/0165301 A1* | 7/2006 | Cha et al. | 382/240 |
| 2007/0036227 A1 | 2/2007 | Ishtiaq et al. | |
| 2007/0153892 A1 | 7/2007 | Yin et al. | |
| 2009/0022229 A1* | 1/2009 | Sung | 375/240.25 |
| 2009/0147854 A1 | 6/2009 | Dane et al. | |

FOREIGN PATENT DOCUMENTS

| | | |
|---|---|---|
| JP | 2004-193850 | 7/2004 |
| JP | 2007-274679 | 10/2007 |
| KR | 1020100093112 | 8/2010 |
| WO | 2009076471 | 6/2009 |

* cited by examiner

*Primary Examiner* — Sath V Perungavoor
*Assistant Examiner* — Chia Lun Hang
(74) *Attorney, Agent, or Firm* — F. Chau & Associates, LLC

(57) ABSTRACT

An encoding method comprises receiving a plurality of video frames including first and third reference frames (F1, F3) and a target frame (F2); generating a temporary frame based on assumed constant-velocity motion between the first and third reference frames (F1, F3); comparing the temporary frame target frame to detect nonlinear motion (errors in the temporary frame) between the first and third reference frames and to produce motion vector information between the target frame and at least one of the reference frames according to the comparison; and encoding the reference frames and the motion vector information.

20 Claims, 11 Drawing Sheets

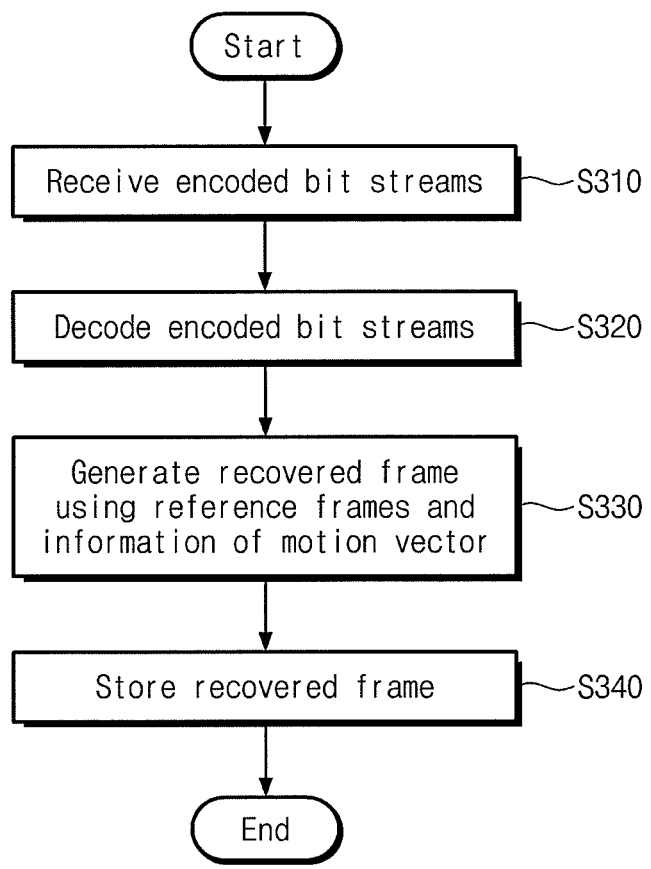

VIDEO FRAME ENCODING TRANSMITTER, ENCODING METHOD THEREOF AND OPERATING METHOD OF VIDEO SIGNAL TRANSMITTING AND RECEIVING SYSTEM INCLUDING THE SAME

CROSS-REFERENCE TO RELATED APPLICATIONS

This application claims the benefits, under 35 U.S.C §119, of Korean Patent Application No. 10-2010-0138073 filed Dec. 29, 2010, the entirety of which is incorporated by reference herein.

TECHNICAL FIELD

Exemplary embodiments relate to a video signal transmitting and receiving system, and more particularly, relate to a video frame encoding transmitter including a frame rate controller, an encoding method thereof, and an operating method of a video signal transmitting and receiving device including the same.

DISCUSSION OF THE RELATED ART

Digital video is stored and transmitted efficiently when it is encoded or compressed to encode redundant information found in multiple adjacent frames. Digital video has a bit rate characteristic, and encoding digital video reduces the bit rate, which reduces the volume of data that must be stored or transmitted per second of the video footage. In general, the bit rate of video data bit stream generated by encoding a video frame is variable and is based on the video's contents. Conditions such as the motion of objects between the video frames, occlusion and light variations, etc. changes the statistics and compressibility of image data between one video frame and a next video frame.

The bit rate of an encoder in a video frame encoding transmitter 110 can be adjusted down at a loss of video quality to fit the capacity of the transfer channel regardless of video contents. If image data (video frames) are transmitted by a low bit rate, a low quality of video contents may be transmitted and received. If image data (video frames) are transmitted by a high bit rate, a high temporal and spatial quality of video contents may be preserved.

In the event that the data width having a narrow transmission channel is allowed, a video frame encoding transmitter 110 can adjust the quantization of video frames or skip encoding of a part of video frames to reduce its bit rate.

SUMMARY

One aspect of embodiments of embodiments of the inventive concept is directed to reduce the data amount of a bit stream generated when video frames are encoded and to improve the reliability of image information included in video frames generated when the bit stream is decoded.

One aspect of embodiments of the inventive concept is directed to provide an encoding method that comprises receiving a plurality of video frames including reference frames and a target frame; comparing a temporary frame generated by the reference frames and the target frame to provide motion vector information between the target frame and at least one of the reference frames according to the comparison; and encoding the reference frames and the motion vector information, wherein the temporary frame is generated according to motion information between moving objects included in the respective reference frames.

In this embodiment, the comparing comprising comparing image data of the temporary frame and image data of the target frame macro block by macro block.

In this embodiment, the comparing comprising determining whether to provide the motion vector whenever the image data of the temporary frame and the image data of the target frame are compared macro block by macro block.

In this embodiment, the temporary frame is generated by estimating image data of the target frame.

In this embodiment, each of the temporary frame and the target frame comprises of a plurality of macro blocks, and wherein the comparing comprises detecting at least one nonlinear macro block of the target frame by comparing macro blocks of the temporary frame with macro blocks of the target frame.

In this embodiment, the temporary frame is generated macro block by macro block, and wherein the comparing comprises, whenever a macro block of the temporary frame is generated, detecting a nonlinear macro block of the target frame by comparing a macro block of the temporary frame and a spatially corresponding macro block of the target frame.

In this embodiment, the comparing comprises providing the motion vector information between the detected nonlinear macro block of the target frame and a macro block in at least one of the reference frames.

In this embodiment, the motion vector information is provided when the number of the detected nonlinear macro blocks is below a predetermined number.

In this embodiment, the encoding comprises encoding a replace frame of replacing the target frame together with the reference frames and the motion vector information.

In this embodiment, the replace frame has image data being identical to one of the reference frames.

Another aspect of embodiments of the inventive concept is directed to provide a video frame encoding transmitter 110 comprising a frame rate controller configured to receive video frames including reference frames and a target frame and to provide motion vector information between the target frame and at least one of the reference frames; and an encoder configured to encode the video frames or to encode the reference frames and the motion vector information when the motion vector information is provided, wherein the frame rate controller is further configured to determine whether to supply the motion vector information by generating a temporary frame according to motion information between moving objects in the reference frames and comparing the temporary frame and the target frame.

In this embodiment, the frame rate controller comprises a comparing unit configured to detect nonlinear macro blocks of the target frame by comparing image data of the temporary frame and image data of the target frame macro block by macro block.

In this embodiment, the frame rate controller further comprises a temporary frame generating unit configured to generate the temporary frame macro block by macro block using motion vectors between macro blocks in the reference frames and to transfer the generated macro blocks to the comparing unit.

In this embodiment, the comparing unit generates macro block information including position information of the detected nonlinear macro blocks.

In this embodiment, the frame rate controller further comprises a motion vector calculating unit configured to generate the motion vector information between nonlinear macro blocks of the target frame corresponding to the position information and macro blocks in at least one of the reference frames.

In this embodiment, the encoder encodes a replace frame of replacing the target frame together with the reference frames and the motion vector information.

In this embodiment, the encoder encodes the replace frame to output a bit stream including meta data, the meta data representing that the replace frame is a video frame having the same image data as one of the reference frames.

In this embodiment, the frame rate controller transfers target frame information together with the motion vector information, and wherein the encoder receives the video frames, divides the video frames into the reference frames and the target frame according to the target frame information, and encodes a replace frame of replacing the target frame together with the motion vector information.

In this embodiment, the video frame encoding transmitter 110 further comprises an internal buffer configured to temporarily store the motion vector information.

Still another aspect of embodiments of the inventive concept is directed to provide an operating method of a video signal transmitting and receiving system comprising receiving a plurality of video frames including reference frames and a target frame; comparing a temporary frame generated by the reference frames with the target frame to provide motion vector information between the target frame and at least one of the reference frames according to the comparison; generating bit stream by encoding the reference frames and the motion vector information; generating the reference frames and the motion vector information by decoding the bit stream; and generating the target frame using at least one of the reference frames and the motion vector information, wherein the temporary frame is generated according to motion information between moving objects included in the respective reference frames.

The inventive concept is described more fully hereinafter with reference to the accompanying drawings, in which embodiments of the inventive concept are shown. This inventive concept may, however, be embodied in many different forms and should not be construed as limited to the embodiments set forth herein. Rather, these embodiments are provided so that this disclosure will be thorough and complete, and will fully convey the scope of the inventive concept to those skilled in the art. Like numbers refer to like elements throughout.

It will be understood that, although the terms first, second, third etc. may be used herein to describe various elements, components, regions, and/or sections, these elements, components, regions, and/or sections should not be limited by these terms. These terms are only used to distinguish one element, component, regionor section from another regionor section. Thus, a first element, component, region or section discussed below could be termed a second element, component, region or section without departing from the teachings of the inventive concept.

The terminology used herein is for the purpose of describing particular embodiments only and is not intended to be limiting of the inventive concept. As used herein, the singular forms "a", "an" and "the" are intended to include the plural forms as well, unless the context clearly indicates otherwise. As used herein, the term "and/or" includes any and all combinations of one or more of the associated listed items.

It will be understood that when an element or block is referred to as being "connected to", "coupled to", or "adjacent to" another element or block, it can be directly connected, coupled, or adjacent to the other element or block, or intervening elements or block may be present. In contrast, when an element is referred to as being "directly connected to", "directly coupled to", or "immediately adjacent to" another element or block, there are no intervening elements or blocks present.

BRIEF DESCRIPTION OF THE FIGURES

The above and other objects and features will become apparent from the following description with reference to the following figures, wherein like reference numerals refer to like parts throughout the various figures unless otherwise specified, and wherein:

FIG. 11 is a flowchart of an operating method of the bit stream encoding receiver 120 in FIG. 1.

DETAILED DESCRIPTION

Figure 1:
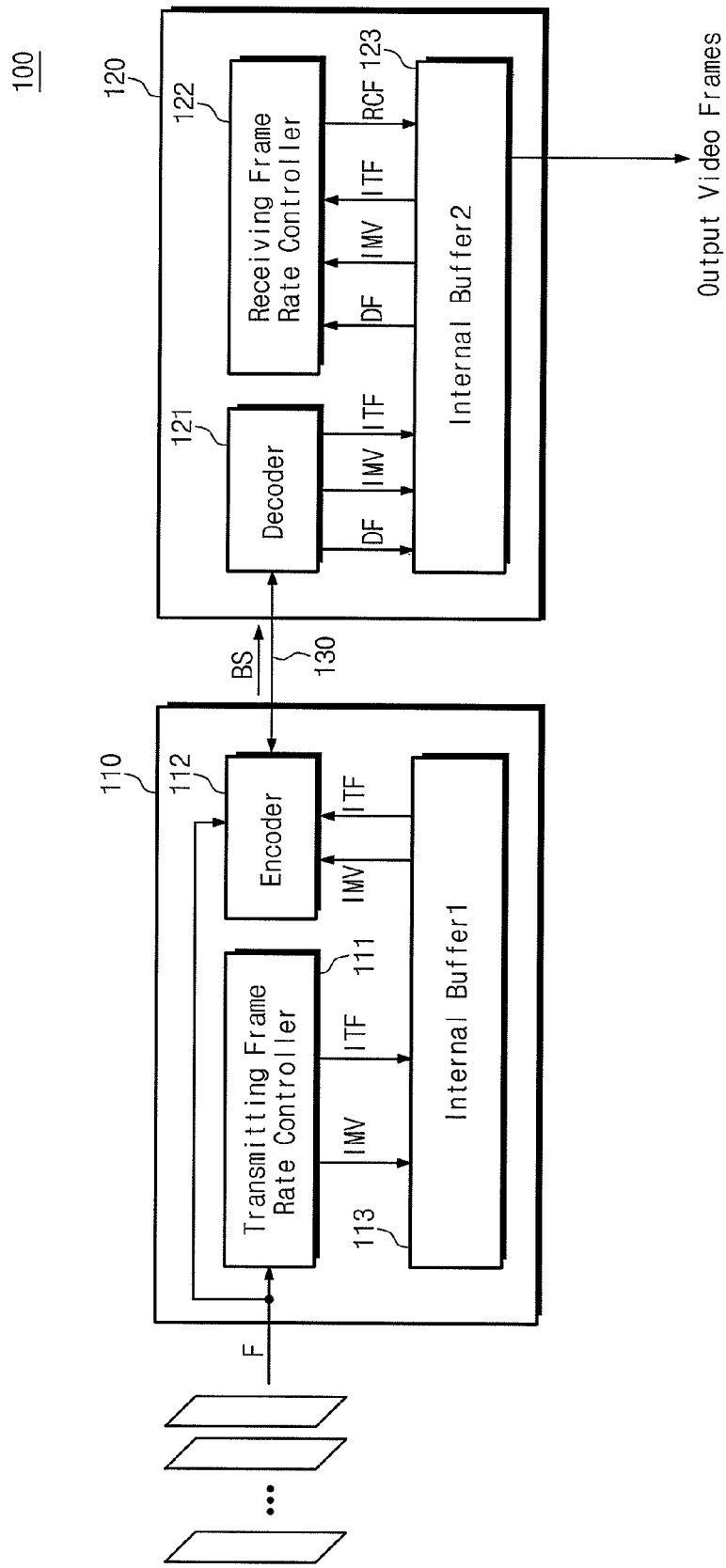
FIG. 1 is a block diagram of an video data transmitting and receiving system according to an exemplary embodiment of the inventive concept.

FIG. 1 is a block diagram of an video data transmitting and receiving system according to an exemplary embodiment of the inventive concept. Referring to FIG. 1, a video data transmitting and receiving system 100 includes a video frame encoding transmitter 110 and a video stream decoding receiver 120.

The video frame encoding transmitter 110 encodes input video frames F to generate bit stream BS. The video frame encoding transmitter 110 comprises a transmitting frame rate controller 111, an encoder 112, and a first internal buffer 113.

The encoder 112 outputs video frame data as a bit stream BS. The bit stream BS may be transmitted to and received by one or more copies of the bit stream decoding receiver 120. The bit stream decoding receiver 120 decodes the bit stream BS to produce and output video frames. The output video frames may be provided directly or indirectly to an image display device (not shown). The image display device may display each image of the video stream according to the sequence of output video frames.

The frame rate controller 111 receives a plurality of image frames (e.g., related to each other as frames of video) F. The frame rate controller 111 generates motion vector information IMV and target frame information ITF based on the video frames F.

The video frames F are selectively designated reference frames and target frames, and the selection is recorded as the target frame information ITF. The motion vector information IMV includes motion information of motion detected between moving objects included in the target frame and at least one of the reference frames, respectively. The motion vector information IMV and the target frame information ITF may be sent to the first internal buffer 113.

The encoder 112 also receives the video frames F. The encoder 112 receives the motion vector information IMV and the target frame information ITF. The encoder 112 discriminates a target frame from among the input video frames F based on the target frame information ITF. While the motion vector information IMV and target frame information ITF are received, the encoder 112 may encode the reference frames and the motion vector information IMV to generate the bit stream BS.

In an exemplary embodiment, the encoder 112 convert image data of the video frames F from a spatial domain to another domain such as a frequency domain and/or the temporal domain. For example, the encoder 112 may be configured to quantize each video frame. Alternatively, the encoder 112 may an entropy encoder. The entropy encoder may use a context adaptive variable length coding (CAVLC) algorithm. The encoding performed by the encoder 112 may be performed according to existing or future video frame compression standards such as MPEG-1, MPEG-2, MPEG-4, H.263, H.264, and the like. Encoded data may use quantized data, data converted to a domain different from a spatial domain, compressed data, or a combination thereof.

The transmitting frame rate controller 111 provides the target frame information ITF. A particular video frame (i.e., a target frame) corresponding to the target frame information ITF may not be encoded by the encoder 112. The encoder 112 may encode a substitute frame instead of a particular video frame corresponding to the target frame information ITF. The transmitting frame rate controller 111 may provide the motion vector information IMV sufficient that a target frame is recovered by a receiving frame rate controller 122 (of a receiver 120) receiving the bit stream BS.

In an exemplary embodiment, although not shown in FIG. 1, the transmitting frame rate controller 111 may adjust the quantization level of each video frame by providing a quantization parameter (QP) to the encoder 112. For example, in a case where the quantization parameter of a large value is provided, the quantization error of each video frame may increase compared with the case that the quantization parameter of a small value is provided.

In a preferred embodiment, the first internal buffer 113 temporarily stored the motion vector information IMV and the target frame information ITF received from the transmitting frame rate controller 111. The first internal buffer 113 later provides the motion vector information IMV and the target frame information ITF to the encoder 112.

The bit stream decoding receiver 120 comprises a decoder 121, a receiving frame rate controller 122, and the second internal buffer 123.

The bit stream BS may be sent to the bit stream decoding receiver 120 through a digital network 130. In an exemplary embodiment, the digital network 130 may include at least one of be a cable, an optical fiber, and a part of a wireless communication system. In the case of the wireless communication system, the digital network 130 may include a communication system using any one of CDMA Code Division Multiple Access), WCDMA (Wideband CDMA), FDMA (Frequency Division Multiple Access), OFDMA (Orthogonal FDMA), GSM (Global System for Mobile communication), EDGE (Enhanced Data GSM Environment), GPRS (General Packet Radio Service), and TETRA (TErrestrial Trunked RAdio), or a combination thereof.

The decoder 121 decodes the bit stream BS to generate decoded video frames DF, the motion vector information IMV, and the target frame information ITF. The decoded video frames DF, the motion vector information IMV, and the target frame information ITF may be stored in the second internal buffer 123.

The receiving frame rate controller 122 receives the decoded video frames DF, the motion vector information IMV, and the target frame information ITF (e.g., from the second internal buffer 123). The receiving frame rate controller 122 generates a recovered frame RCF using the motion vector information IMV. The recovered frame RCF may include image data representing an image like that of the original target frame. The receiving frame rate controller 122 may replace a replace frame stored in the second internal buffer 123 with the recovered frame RCF based on the target frame information ITF.

The second internal buffer 123 stores the decoded video frames DF, the motion vector information IMV, and the target frame information ITF. The second internal buffer 123 provide the receiving frame rate controller 122 with the decoded video frames DF, the motion vector information IMV, and the target frame information ITF. The second internal buffer 123 may store the recovered frame RCF received from the receiving frame rate controller 122.

In an exemplary embodiment, each of the first and second internal buffers 113 and 123 may be implemented with of any one of SRAM, DRAM, SDRAM, EEPROM, flash memory, PRAM, MRAM, RRAM, FRAM, and HDD, or a combination thereof.

Figure 2:
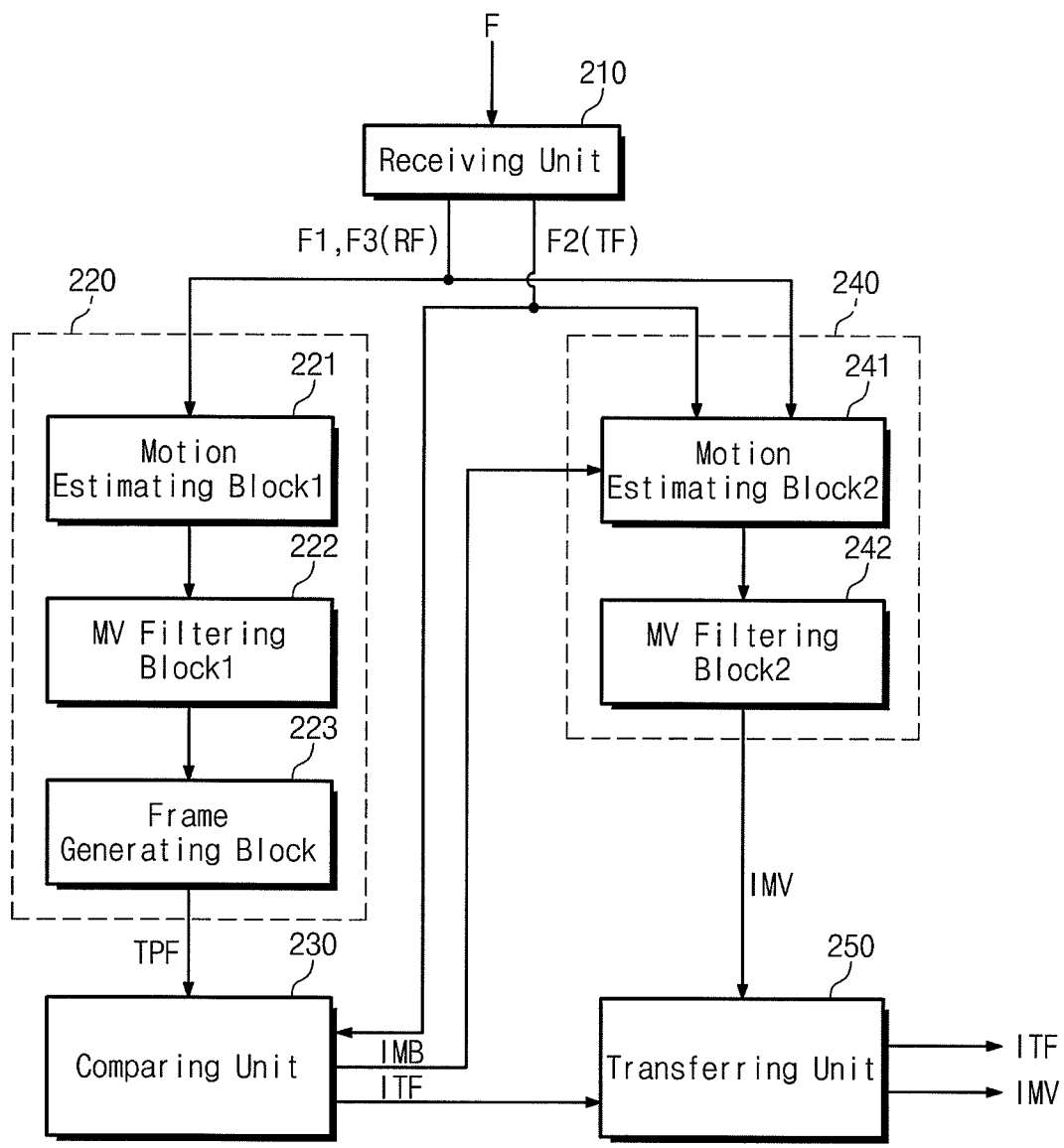
FIG. 2 is a block diagram of a transmitting frame rate controller in the encoding transmitter 120 in the system of FIG. 1.

FIG. 2 is a block diagram of a transmitting frame rate controller 111 of the encoding transmitter 120 in the system of FIG. 1. Referring to FIG. 2, the transmitting frame rate controller 111 includes a receiving unit 210, a temporary frame generating unit 220, a comparing unit 230, a motion vector calculating unit 240, and a transferring unit 250.

The receiving unit 210 receives video frames F from an external source (e.g., from an image sensor). The receiving unit 210 may send reference frames RF selected from among the video frames F to the first and second motion estimating blocks 221 and 241. The receiving unit 210 sends a target frame TF selected from among the video frames F to the second motion estimating block 241 and to the comparing unit 230. Hereinafter, it is assumed that the reference frames are the first and third video frames F1 and F3 and that the target frame TF is the second video frame F2. Thus, the receiving unit 210 may select the first and third video frames F1 and F3 to be reference frames RF and select the second video frame F2 to be a target frame TF. In FIG. 2, there is shown an example that reference frames RF are formed of two video frames per target frame TF. But, it is well understood that reference frames RF can be formed of three or more video frames per target frame TF.

The temporary frame generating unit 220 estimates the second video frame F2 (a target frame TF) using the first and third video frames F1 and F3 (reference frames RF). The temporary frame generating unit 220 generates a temporary frame TPF, as an estimation result. The temporary frame generating unit 220 includes the first motion estimating block 221, the first motion vector filtering block 222, and a frame generating block 223.

The first motion estimating block 221 receives the first and third video frames F1 and F3. The first motion estimating block 221 detects and estimates motion information of moving objects included in the first and third video frames F1 and F3. The first motion estimating block 221 calculates motion vectors of the motion of the moving objects in the scene according to the detected motion information. The first motion estimating block 221 estimates motion vectors between at least one of the reference frames RF (e.g., the first and/or third video frames F1 and F3) and the current target frame TF (e.g., the second video frame F2). For example, each video frame may be divided into a plurality of macro blocks, and motion vectors may be estimated with respect to all macro blocks constituting the target frame TF (second video frame F2).

The first motion estimating block 221 detects how a moving object covering a plurality of macro blocks moves, macro block by macro block. For example, the first motion estimating block 221 judges whether macro blocks of the first video frame F1 correspond to any macro blocks of the third video frame F3, by analyzing image data of the first and third video frames F1 and F3. The first motion estimating block 221 calculates motion vectors between macro blocks of the first video frame F1 and macro blocks of the third video frame F3.

The first motion estimating block 221 estimates motion vectors between macro blocks included in any one of the first and third video frames F1 and F3 and macro blocks of the second video frame F2, according to the calculated motion vectors.

If the first to third video frames F1 to F3 are received in sequence, motion vector values between macro blocks of the first video frame F1 and macro blocks of the second video frame F2 may be estimated to be half motion vector values of the motion vectors between macro blocks of the first video frame F1 and macro blocks of the third video frame F3.

If the first, third, and second video frames F1, F3, and F2 are received in sequence, motion vector values between macro blocks of the first video frame F1 and macro blocks of the second video frame F2 may be estimated to be double the motion vector values of motion vectors between macro blocks of the first video frame F1 and macro blocks of the third video frame F3. The estimated motion vectors may be motion information between macro blocks included in the first and third video frames F1 and F3 and macro blocks of the temporary frame TPF.

The first motion vector filtering block 222 filters motion vectors corresponding to macro blocks. For example, the first motion vector filtering block 222 may refer to motion vectors of macro blocks peripheral to (e.g., horizontally and vertically adjacent to) a selected macro block to calculate a motion vector of the selected macro block. The first motion vector filtering block 222 may apply weights to motion vectors of the peripheral macro blocks and the selected macro block, respectively, to calculate the motion vector of the selected macro block by weighted interpolation with the peripheral macro blocks.

The frame generating block 223 generates a temporary frame using the calculated motion vectors of the plurality of macro blocks. The frame generating block 223 may generate the temporary frame TPF using motion vectors and macro blocks included in at least one of the reference frames (e.g., in the first and/or third video frames F1 and F3). As a result, the temporary frame generating unit 220 may generate the temporary frame TPF by estimating the second video frame F2 using the first and third video frames F1 and F3, and using the assumption of linear (constant velocity) motion of objects moving therebetween.

The comparing unit 230 compares the temporary frame TPF and the second video frame F2 to generate nonlinear macro block information IMB as a comparison result. The nonlinear macro block information IMB may be or include position information of nonlinear macro blocks within one frame. In an exemplary embodiment, the comparing unit 230 compares the temporary frame TPF and the second video frame F2 macro block by macro block. For example, the comparing unit 230 may detect macro blocks having a large image difference by comparing macro blocks of the temporary frame TPF with the coordinate macro blocks of the second video frame. Then the comparing unit 230 generates nonlinear macro block information IMB associated with the detected nonlinear macro blocks. For example, the comparing unit 230 may calculate SAD (Sum of Absolute Difference) between each macro block in the temporary frame TPF and each coordinate macro block in the second video frame F2. The comparing unit 230 may detect macro blocks for inclusion in the nonlinear macro block information IMB when SAD is larger than a threshold value.

In an exemplary embodiment, it is assumed that moving objects in the first to third video frames F1 to F3 move linearly (in a specific direction at a constant speed). The image data of the temporary frame TPF may be similar to that of the second video frame F2 (the target frame). the image data of the temporary frame TPF may alternatively be very different that of the second video frame F2 (the target frame) in the cases that a moving object in the first video frame F1 disappears from the third video frame F3, such that that a motion characteristic is changed sharply, and that moving objects in the first and third video frames F1 and F3 have an occlusion attribute. In an exemplary embodiment, under the above-described cases, the transmitting frame rate controller 111 may control an encoder 112 such that the second video frame F2 is not encoded. The transmitting frame rate controller 111 may provide the motion vector information IMV corresponding to the second video frame F2.

The comparing unit 230 calculates a difference function between the temporary frame TPF and the second video frame F2. The comparing unit 230 determines generation of the nonlinear macro block information IMB according to the cost function. For example, the comparing unit 230 may calculate the cost function by calculating SAD between image data values of the temporary frame TPF and image data values of the second video frame F2.

The motion vector calculating unit 240 also receives the first to third video frames F1 to F3 and the nonlinear macro block information IMB. The motion vector calculating unit 240 generates the motion vector information IMV between at least one of the first and third video frames F1 and F3 and the second video frame F2. The motion vector information IMV includes the values of a plurality of motion vectors, information identifying the video frames being the basis of respective motion vectors, and information identifying the nonlinear macro blocks being the basis of respective motion vectors.

The motion vector calculating unit 240 includes the second motion estimating block 241 and the second motion vector filtering block 242. The second motion estimating block 241 receives the nonlinear macro block information IMB from the comparing unit 230 and calculates motion vectors of nonlinear macro blocks corresponding to the nonlinear macro block information IMB among macro blocks of the second video frames F2.

In an exemplary embodiment, the second motion estimating block 241 produces motion vector information IMV between the first video frame F1 and the second video frame F2. The motion vector calculating unit 240 judges macro blocks of the first and second video frames F1 and F2 corresponding to the nonlinear macro block information IMB. The motion vector calculating unit 240 calculates motion vectors between macro blocks of the first video frame F1 thus judged and macro blocks of the second video frame F2 thus judged. At this time, the motion vector information IMV may include values of motion vectors, information indicating that the first video frame F1 is the video frame serving as the standard (basis frame) of motion vectors, and information identifying the detected nonlinear macro blocks being the basis of each motion vector.

The second motion vector filtering block 242 filters the calculated motion vectors. For example, the second motion vector filtering block 242 calculates the interpolated motion vector of a selected macro block by applying weights to the detected motion vector of the selected macro block and the calculated motion vectors of macro blocks peripheral to the selected macro block. Afterward, the second motion vector filtering block 242 generates the motion vector information IMV.

In an exemplary embodiment, the temporary frame generating unit 220 and the motion vector calculating unit 240 calculate motion vectors considering translational motion, rotational motion, shearing, parallel shift, zoom-in and zoom-out motion, variations causing background object type violation, and global motions.

The transferring unit 250 receives the target frame information ITF from the comparing unit 230 and the motion vector information IMV from the motion vector calculating unit 240. The transferring unit 250 transfers the target frame information ITF and the motion vector information IMV to the first internal buffer 113. The target frame information ITF and the motion vector information IMV are temporarily stored in the first internal buffer 113 and then provided to the encoder 112. The encoder 112 discriminates the second video frame F2 (a target frame) from input video frames F according to the target frame information ITF. The encoder 112 does not encode the second video frame F2 (the target frame). The encoder 112 may encode a replace frame (not shown) for replacing the second video frame F2, the first and third video frames, and the motion vector information IMV.

The transmitting frame rate controller 111 provides motion vector information related to a target frame TF. The encoder 112 may encode a replace frame for replacing a target frame and the motion vector information IMV. Thus, it is possible to reduce the data volume of the bit stream BS generated by a video frame encoding transmitter 110.

Figure 3:
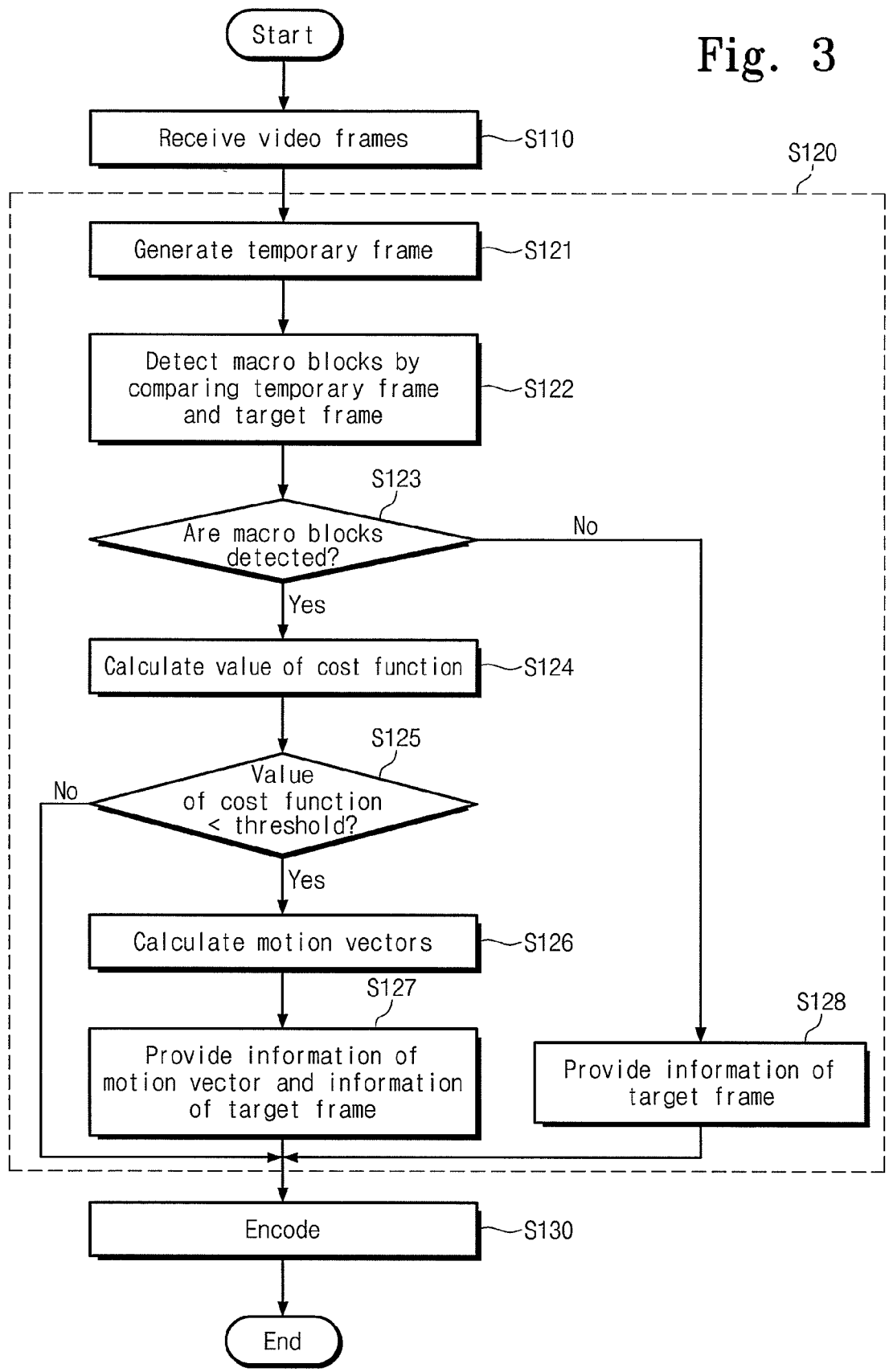
FIG. 3 is a flowchart of an encoding method according to a first exemplary embodiment of the inventive concept.

FIG. 3 is a flowchart of an encoding method according to a first exemplary embodiment of the inventive concept. Referring to FIGS. 1 to 3, in step S110, a video frame encoding transmitter 110 receives video frames F, which are provided to a transmitting frame rate controller 111 and an encoder 112. The video frames F include the first and third video frames F1 and F3 as reference frames and the second video frame F2 as a target frame.

In step S120, the transmitting frame rate controller 111 compares a temporary frame TPF with the target frame TF. Based on the comparison, there may be determined transferring of motion vector information IMV between at least one of the first and third video frames F1 and F3 and the target frame TF. The temporary frame TPF is generated according to motion information between moving objects in the first and third video frames F1 and F3. The step S120 may include sub steps S121 through S128.

In step S121, the temporary frame generating unit 220 generates the temporary frame TPF based on the first and third video frames F1 and F3. The temporary frame generating unit 220 calculates motion vectors between the first and third video frames F1 and F3. The temporary frame generating unit 220 produces the temporary frame TPF using the calculated motion vector.

In step S122, the comparing unit 230 detects macro blocks of the target frame TF by comparing macro blocks of the temporary frame TPF and macro blocks of the target frame TF. The comparing unit 230, for example, may detect macro blocks having a large image difference between the temporary frame TPF and the target frame TF. The comparing unit 230 calculate SAD between the image data values of each macro block of the temporary frame TPF and the image data values of each macro block of the target frame TF. Nonlinear macro blocks having a large image difference may be detected by comparing the calculated SAD with a predetermined threshold value.

In step S123, the comparing unit 230 judges whether nonlinear macro blocks are detected. If nonlinear macro blocks are detected, the method proceeds to step S124. If nonlinear macro blocks are not detected, the method proceeds to step S128.

In step S124, the comparing unit 230 calculates a cost function. For example, the comparing unit 230 may calculate the cost function by calculating the SAD between all image data values of the temporary frame TPF and all image data values of the second video frame F2 (the target frame TF). For example, the comparing unit 230 may determine a value of the cost function according to the number of the detected nonlinear macro blocks. The value of the cost function may indicate the difference of image data between the temporary frame TPF and the target frame TF. The greater the value of the cost function between the temporary frame TPF and the target frame TF, the greater the difference of image data between the temporary frame TPF and the target frame TF.

In step S125, the comparing unit 230 compares the value of the cost function with a threshold value. The comparing unit 230 determines generation of nonlinear macro block information IMB according to the value of the cost function. If the value of the cost function is less than the threshold value, then in step S126, there may be generated the nonlinear macro block information IMB and the motion vector information IMV. If the value of the cost function is larger than the threshold value, then the nonlinear macro block information IMB and the motion vector information IMV may not be generated and the comparing unit 230 does not generate target frame information ITF. At this time, (step S130) the encoder 112 encodes all of the first to third video frames F1 to F3.

In step S126, (if in step S125, the value of the cost function is less than the threshold value) the motion vector calculating unit 126 calculates motion vectors of nonlinear macro blocks corresponding to the nonlinear macro block information IMB. The motion vector calculating unit 126 calculates motion vectors between at least one of the first and third video frames F1 and F3 and the target frame TF. The motion vector calculating unit 126 generates the motion vector information IMV. The motion vector information IMV includes the values of calculated motion vectors, information identifying the video frame being the standard (basis) of respective motion vectors, and information identifying the detected nonlinear macro blocks being the basis of respective motion vectors.

In step S127, the motion vector information IMV and the target frame information ITF are provided to the encoder 112. In alternate step S128 (if nonlinear macro blocks are not detected in step S123), only the target frame information ITF is provided to the encoder 112.

In step S130, the encoder 112 performs an encoding operation according to the control of the transmitting frame rate controller 111. When the motion vector information IMV and the target frame information ITF are received (step S127), the encoder 112 encodes the motion vector information IMV, the target frame information ITF, and the first and third video frames F1 and F3 being reference frames.

If only the target frame information ITF is received (step S128), the encoder 112 encode the first and third video frames F1 and F3 and a replace frame. If the motion vector information IMV and the target frame information ITF are not received (NO branch of decision step S125), the encoder 112 encodes the first to third video frames F1 to F3.

Figure 4:
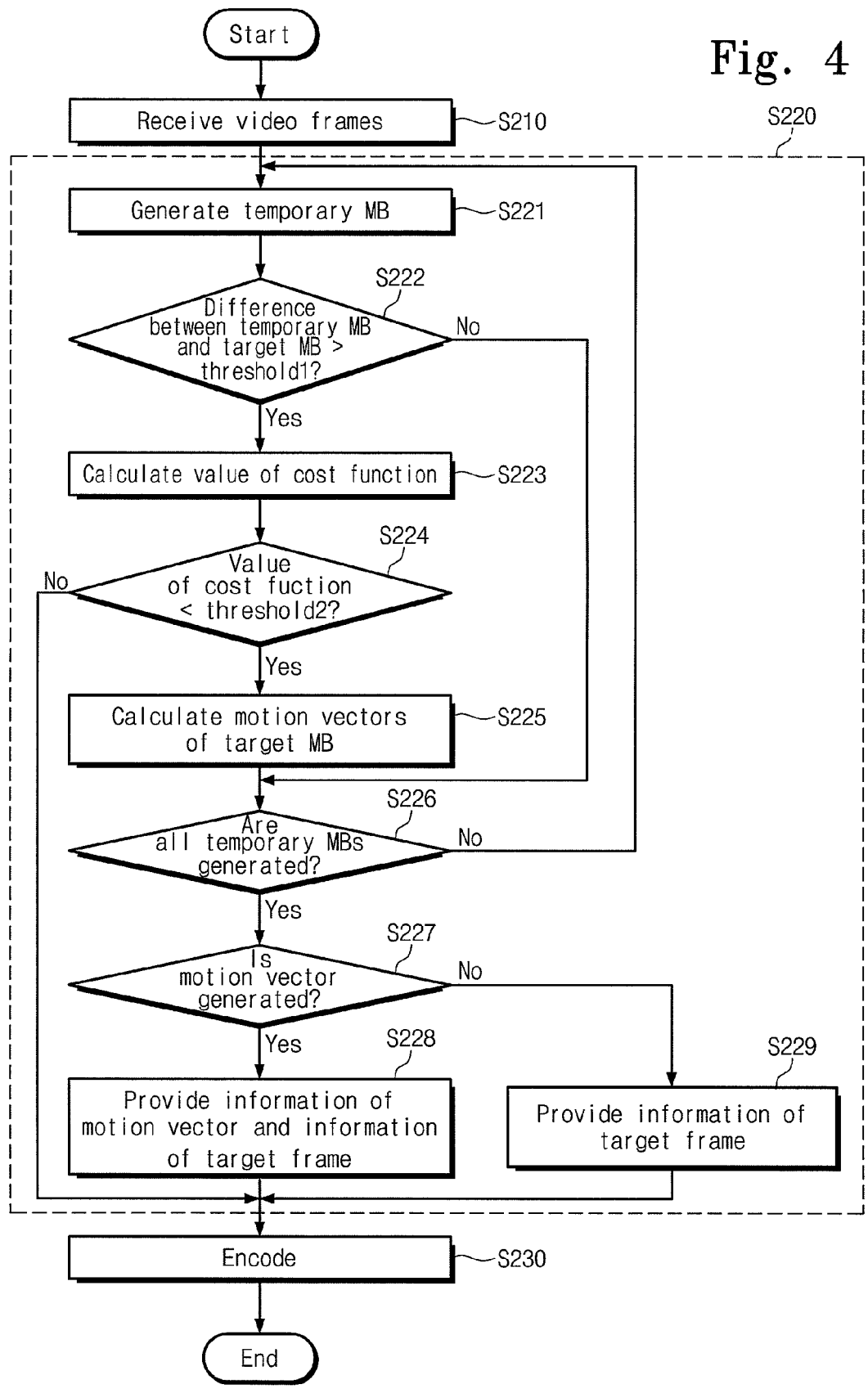
FIG. 4 is a flowchart of an encoding method according to a second exemplary embodiment of the inventive concept.

FIG. 4 is a flowchart of an encoding method according to a second exemplary embodiment of the inventive concept. Referring to FIGS. 1, 2, and 4, in step S210, a video frame encoding transmitter 110 receives video frames F. In step S220, the transmitting frame rate controller 111 generates a temporary frame TPF using the first and third video frames F1 and F2 as reference frames and compare the second video frame F2 (a target frame) with the temporary frame TPF. Based on the comparison, the transmitting frame rate controller 111 provides motion vector information IMV between at least one of the first and third video frames F1 and F3 and the second video frame F2. At this time, the temporary frame TPF may be produced macro block by macro block. The step S220 may include sub steps S221 to S229.

The steps S221 to S225 may be carried out to compare a generated macro block and a macro block of a target frame TF and to calculate a motion vector, whenever a macro block is generated. In step S221, the temporary frame generating unit 220 produces each macro block (hereinafter, referred to as a temporary macro block), constituting a temporary frame, using the first and third video frames F1 and F3.

In step S222, the comparing unit 230 compares the temporary macro block with a macro block (hereinafter, referred to as a target macro block) of a target frame TF corresponding to the position of the temporary macro block. The comparing unit 230 judges whether an image data difference between each temporary macro block and the target macro block is large.

The comparing unit 230 calculates the SAD (sum of absolute differences) between image data values of the temporary macro block and image data values of the target macro block. The comparing unit 230 judges whether the calculated SAD is larger than the first threshold value. If the calculated SAD is larger than the first threshold value, then the method proceeds to step S223. If the calculated SAD is not larger than the first threshold value, then the method proceeds to step S226.

In step S223, the comparing unit 230 calculates the cost function. For example, the cost function may be calculated as the SAD between image data values of target macro blocks corresponding to temporary macro blocks and image data values of temporary macro blocks generated by performing the steps S221 to S226 iteratively. The cost function may be calculated by performing a count operation whenever the SAD between image data values of the temporary macro block and image data values of the target macro block is larger than the first threshold value (YES branch of step S222).

In step S224, the comparing unit 230 compares a value of the cost function with the second threshold value. The comparing unit 230 generates nonlinear macro block information IMB when the value of the cost function is less than the second threshold value (YES branch of step S224). The step S225 (the comparing unit 230 sends the nonlinear macro block information IMB to the motion vector calculating unit 240) is carried out when the value of the cost function is less than the second threshold value (YES branch of step S224). If the value of the cost function is larger than the second threshold value (NO branch of step S224), the method proceeds directly to step S230.

In step S225, the motion vector calculating unit 240 calculates the motion vector associated with each target macro block. The target macro block corresponds to the nonlinear macro block information IMB received from the comparing unit 230. The motion vector calculating unit 240 produces motion vector information IMV including values of calculated motion vectors, information identifying the video frame (s) being the standard (basis) of respective motion vectors, and information identifying the macro blocks being a standard (basis) of respective motion vectors.

In step S226, the comparing unit 230 checks whether all target macro blocks included in the target frame TF are generated. If all target macro blocks included in the target frame TF are generated (YES branch of step S226), all macro blocks of the temporary frame TPF may be compared with all macro blocks of the second video frame F2 (i.e., a target frame). At this time, the step S227 may be carried out. If all target macro blocks included in the target frame TF are not generated (NO branch of step S226), the target macro block index is incremented and the method returns back to step S221. In an exemplary embodiment, the comparing unit 230 sends a control signal (not shown) to the first motion estimating block 221. The first motion estimating block 221 generates another temporary macro block in response to the control signal from the comparing unit 230.

In step S227, it is judged whether a motion vector is generated. If no motion vector is generated, the method proceeds to step S229 and the transferring unit 250 provides only target frame information ITF received from the comparing unit 230 (when one motion vector IMV is not received).

If a motion vector is generated (YES branch of step S227), the method proceeds to step S228 and the transferring unit 250 produces the motion vector information IMV and the target frame information ITF (when the motion vector information is received from the motion vector calculating unit 240).

In step S230, the encoder 112 performs an encoding operation according to the control of the transmitting frame rate controller 111.

Figure 5:
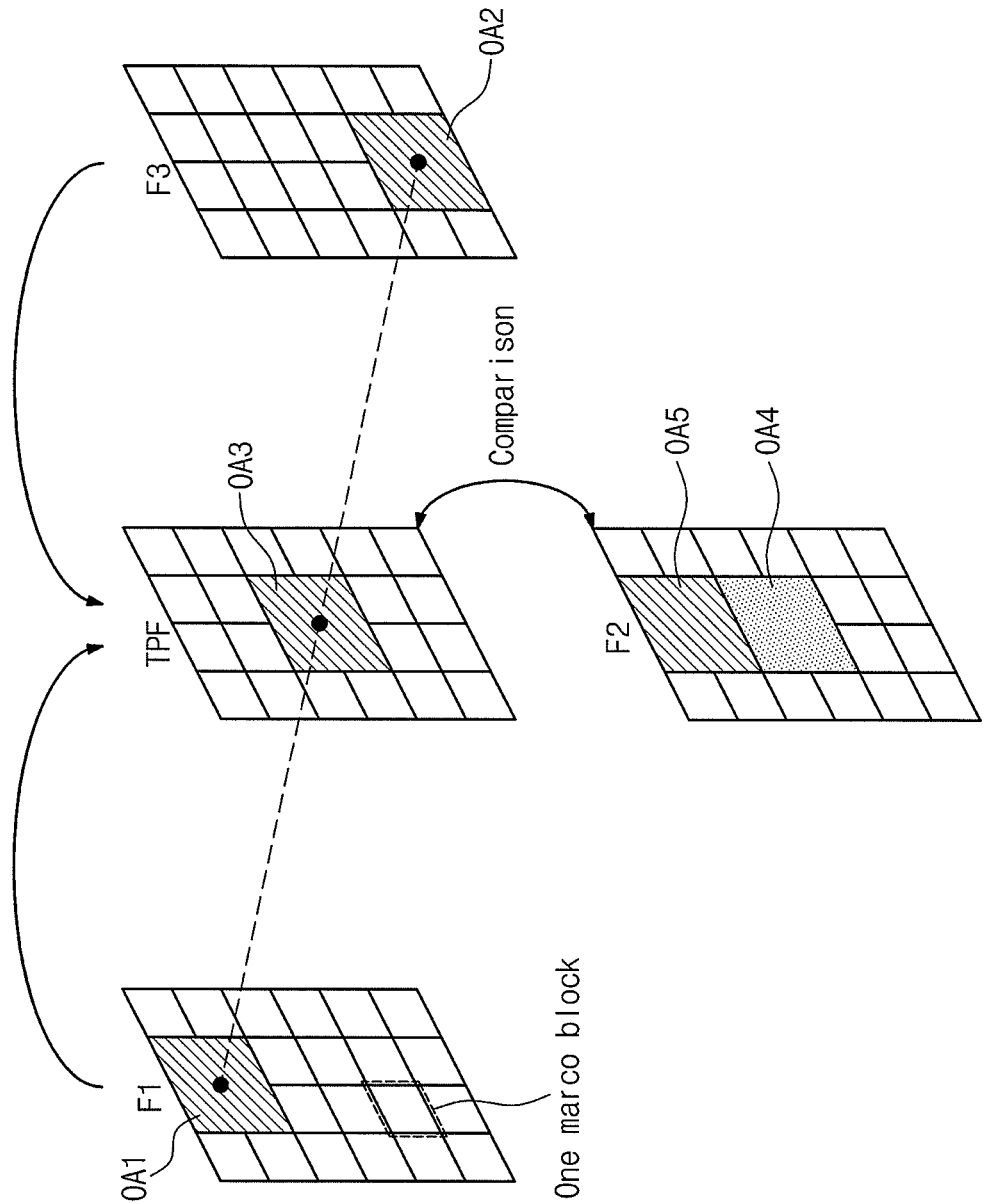
FIG. 5 is a diagram showing the first to third video frames and a temporary frame labeled in FIG. 2.

FIG. 5 is a diagram showing the first to third video frames (F1, F2, F3) and a temporary frame (TPF) labeled in FIG. 2. Referring to FIG. 5, each of the first to third video frames F1 to F3 comprises a plurality of macro blocks. Below, it is assumed that motion of an object in the first video frame F1 spans to the third video frame F3. Thus, the first and third video frames F1 and F3 are assumed to include at least one moving object.

Motion vectors of a first moving object may be calculated based on detecting the position of macro blocks (hereinafter, referred to as the first object area, OA1) including the first moving object in the first video frame F1 and the position of macro blocks (hereinafter, referred to as the second object area, OA2) including the first moving object in the third video frame F3. In an exemplary embodiment, a motion vectors are calculated macro block by macro block. For example, motion vectors may be calculated by comparing each macro block of the first object area OA1 with each macro block of the second object area OA2.

The temporary frame TPF is produced according to the calculated motion vectors. In an exemplary embodiment, the temporary frame generating unit 220 estimate a moving object in the first object area OA1 to be moving linearly (at a constant velocity) to an object area OA2. The third object area OA3 (in the temporary frame TPF) having the same image data as the first or second object area OA1 or OA2 is generated at a position determined according to the estimated motion vector result of the moving object.

Macro blocks corresponding to the third object area OA3 in the second video frame F2 (target frame) may be defined as the fourth object area OA4. The comparing unit 230 compares the third object area OA3 and the fourth object area OA4.

Meanwhile, in an exemplary case it is assumed that the moving object in the first object area OA1 actually moves into the second object area OA2 through (into and then out of) the fifth object area OA5. Thus, in this case, the moving object in the first object area OA1 does not really exist at the fourth object area OA4. Thus, in an exemplary embodiment, the SAD between an image data value of the third object area OA3 and an image data value of the fourth object area OA4 may be greater than the first threshold value (refer to step S222 in FIG. 4).

The motion vector calculating unit 240 calculates motion vectors of specific macro blocks between the first video frame F1 and the fourth object area OA4. Thus, in an exemplary embodiment, the transmitting frame rate controller 111 calculates the motion vectors between specific macro blocks of the first video frame F1 and macro blocks of the fourth object area OA4.

Likewise, the transmitting frame rate controller 111 calculates motion vectors associated with the fifth object area OA5. For example, there may be calculated motion vectors between macro blocks of the first object area OA1 of the first video frame F1 and macro blocks of the fifth object area OA5 of the second video frame F2. There may also be calculated motion vectors between macro blocks of the fifth object area OA5 of the second video frame F2 and macro blocks of the second object area OA2 of the third video frame F3.

Figure 6:
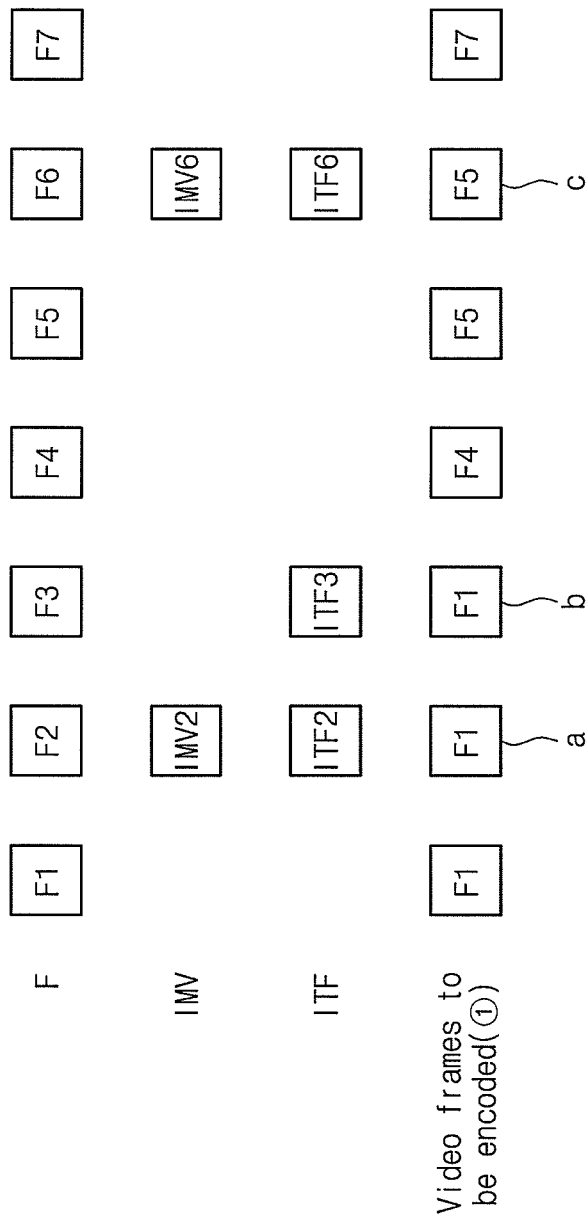
FIG. 6 is a diagram showing video frames F received from the video frame encoding transmitter 110 of FIG. 1 and resulting encoded video frames.

FIG. 6 is a diagram showing video frames F received from the video frame encoding transmitter 110 of FIG. 1 and resulting encoded video frames. Referring to FIG. 6, the first to seventh video frames F1 to F7 are applied to the video frame encoding transmitter 110 in their original sequence.

The transmitting frame rate controller 111 does not generate motion vector information and target frame information about the first video frame F1. An encoder 112 may encode the first video frame F1 as-received.

The transmitting frame rate controller 111 generates the second motion vector information IMV2. Further, the transmitting frame rate controller 111 generates the second target frame information ITF2. The encoder 112 judges whether the second video frame F2 is a target frame, based on an input of the second target frame information ITF2. The encoder 112 encodes a replace frame (a) for replacing the second video frame F2, in response to an input of the second target frame information ITF2. In an exemplary embodiment, image data of the replace frame (a) may be identical to that of any one of reference frames (e.g., F1). For example, image data of the replace frame (a) may be identical to that of a previous video frame (e.g., the first video frame F1). In FIG. 6, it is exemplarily illustrated as an example that the replace frame (a) is identical to the first video frame F1. As a result, the encoder 112 may encode the second motion vector information IMV2, the second target frame information ITF2, and the replace frame (a).

If the first video frame F1 and the replace frame (a) are sequentially encoded and transferred, the encoder 112 may only send information indicating that a current video frame (F2) has the same image data as the previous video frame (F1). Thus, in the event that the bit stream BS is generated by encoding the replacing frame (a), the bit stream BS may include meta data indicating that the replace frame (a) is a video frame having the same image data as the first video frame F1. The data amount of bit stream BS generated upon encoding of the replace frame (a) may be reduced as compared with the case that the second video frame F2 is encoded as-received.

The transmitting frame rate controller 111 generates the third target frame information ITF3 associated with the third video frame F3. The encoder 112 may encode a replace frame (b) replacing the third video frame F3 according to the third target frame information ITF3. The replace frame (b) may have the same image data as the first video frame F1.

Similarly, upon receiving frame F6, the transmitting frame rate controller 111 generates the sixth vector information IMV6 and the sixth target frame information ITF6 about the sixth video frame F6. The encoder 112 may encode a replace frame (c) of replacing the sixth video frame F6 according to the sixth target frame information ITF6. The encoder 112 may encode the sixth motion vector information IMV6, the sixth target frame information ITF6, and the replace frame (c).

By encoding the replace frames (a), (b), and (c), the number of video frames F received at a video frame encoding transmitter 110 may be identical to that of video frames DF decoded at a bit stream encoding receiver 120, while the data amount of bit stream BS generated is reduced.

Figure 7:
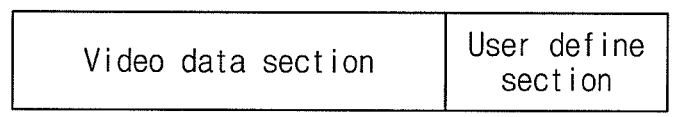
FIG. 7 is a diagram showing a structure of a bit stream BS shown in FIG. 1.

FIG. 7 is a data map showing the structure of the bit stream BS shown in FIG. 1.

Referring to FIG. 7, the bit stream (BS of FIG. 1) 2 may be formed of a video data section and a user define section. In accordance with an exemplary embodiment of the inventive concept, motion vector information IMV and target frame information ITF may be encoded at the user define section, and encoded video frames (e.g., F1, F4, F5 and F7 in FIG. 6) may be encoded as-received in the video data section.

Figure 8:
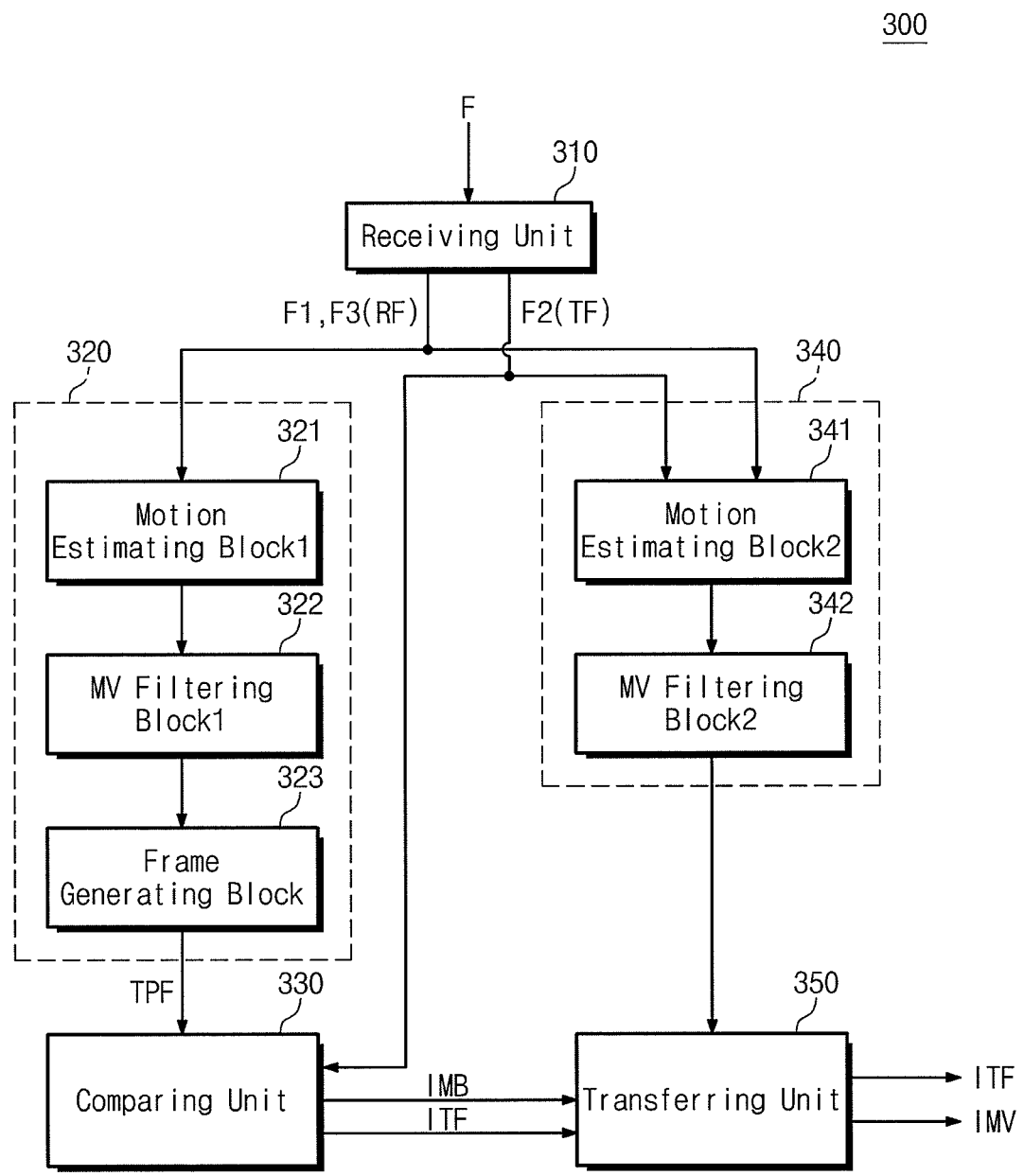
FIG. 8 is a block diagram of a transmitting frame rate controller 300 (111) according to the second exemplary embodiment of the inventive concept.

FIG. 8 is a block diagram of a transmitting frame rate controller 300 (111 in FIG. 1) according to the second exemplary embodiment of the inventive concept. Referring to FIG. 8, the transmitting frame rate controller 300 includes a receiving unit 310, a temporary frame generating unit 320, a comparing unit 330, a motion vector calculating unit 340, and a transferring unit 350. The transmitting frame rate controller 300 processes the generation of a temporary frame TPF and the calculation of motion vectors in parallel. Thus, it is possible to improve an operating speed of the transmitting frame rate controller 300.

The temporary frame generating unit 320 may be configured to be identical to that 220 in FIG. 2. The comparing unit 330 may be configured to be identical to that 230 in FIG. 2 except that nonlinear macro block information IMB is instead sent to the transferring unit 350.

The motion vector calculating unit 340 calculates motion vectors of all macro blocks in the second video frame F2 (target frame TF). The motion vector calculating unit 340 generates motion vector information of all macro blocks in the second video frame F2.

The transferring unit 350 receives any nonlinear macro block information IMB and target frame information ITF from the comparing unit 330. The transferring unit 350 may receive motion vector information of all macro blocks of the second video frame F2. The transferring unit 350 transfers, to the first internal buffer 113, motion vector information IMV of nonlinear macro blocks corresponding to the nonlinear macro block information IMB among the motion vector information received from the motion vector calculating unit 340. The transferring unit 350 also sends the target frame information ITF to the first internal buffer 113.

Figure 9:
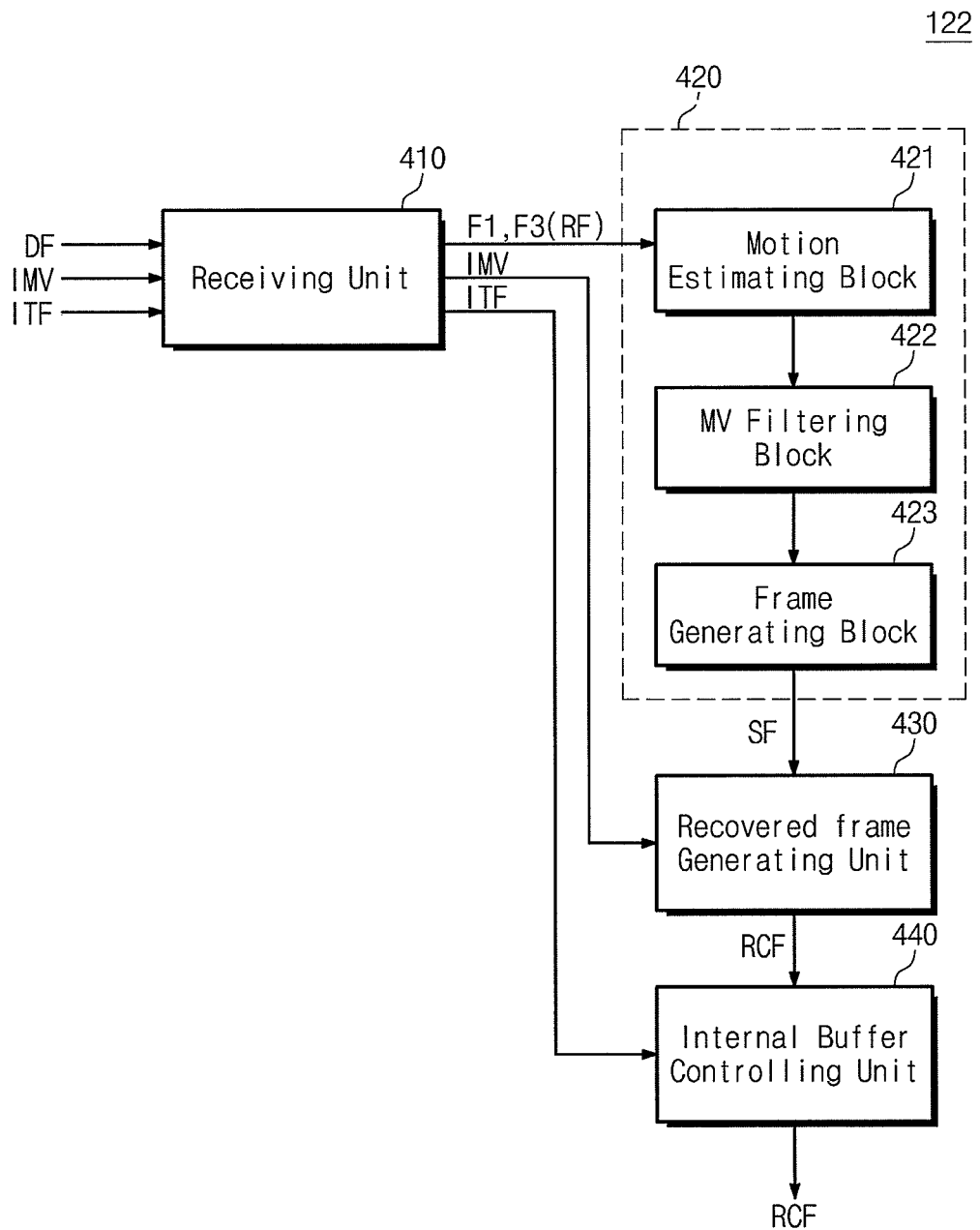
FIG. 9 is a block diagram of a receiving frame rate controller 122 in FIG. 1.

FIG. 9 is a block diagram of the receiving frame rate controller 122 in FIG. 1. Referring to FIG. 9, the receiving frame rate controller 122 includes a receiving unit 410, a sub-frame generating unit 420, a recovered frame generating unit 430, and an internal buffer controlling unit 440. For ease of description, it is assumed that reference frames RF used to generate a recovered frame RCF include the first and third video frames F1 and F3.

The receiving unit 410 receives decoded video frames DF, motion vector information IMV, and target frame information ITF from the second internal buffer 123 (see FIG. 1).

The motion vector information IMV includes information identifying the video frames being the standard of motion vectors. In FIG. 9, video frames being the standard of motion vectors may be the first and third video frames F1 and F3.

The receiving unit 410 transfers the first and third video frames F1 and F3 to the sub-frame generating unit 420 based on the motion vector information IMV. The receiving unit 410 transfers the motion vector information IMV to the recovered frame generating unit 430. The receiving unit 410 transfers the target frame information ITF to the internal buffer controlling unit 440.

The sub-frame generating unit 420 generates a sub-frame SF in the same manner that the temporary frame generating unit 220 in FIG. 2 generated a temporary frame. The sub-frame generating unit 420 includes a motion estimating block 421, a motion vector filtering block 422, and a frame generating block 423.

The motion estimating block 421 detect moving objects moving between the first and third video frames F1 and F3 and calculates their motion vectors. The motion estimating block 421 estimates motion vectors between the second video frame F2 and at least one of the first and third video frames F1 and F3, using the calculated motion vectors.

The motion vector filtering block 422 filters the estimated motion vectors the second video frame F2. For example, to interpolate a motion vector of a selected macro block, the motion vector filtering block 422 may apply weights to a motion vector of the selected macro block and to the motion vectors of macro blocks peripheral to the selected macro block, respectively.

The frame generating block 423 generates a sub-frame SF using the motion vectors of macro blocks, on the basis of at least one of the first and third video frames F1 and F3. The image data of the sub-frame SF may be similar or identical to the image data of a temporary frame TPF described with reference to FIG. 2. The recovered frame generating unit 430 converts the sub-frame SF into a recovered frame RCF using the motion vector information IMV. Since at least one of the first and third video frames F1 and F3 and the motion vector information IMV are used, the recovered frame generating unit 430 may replace some macro blocks of the sub-frame SF to generate the recovered frame RCF. An image of the recovered frame RCF may be similar or identical to an image of the second video frame F2 (a target frame) described with reference to FIG. 2.

Figure 10:
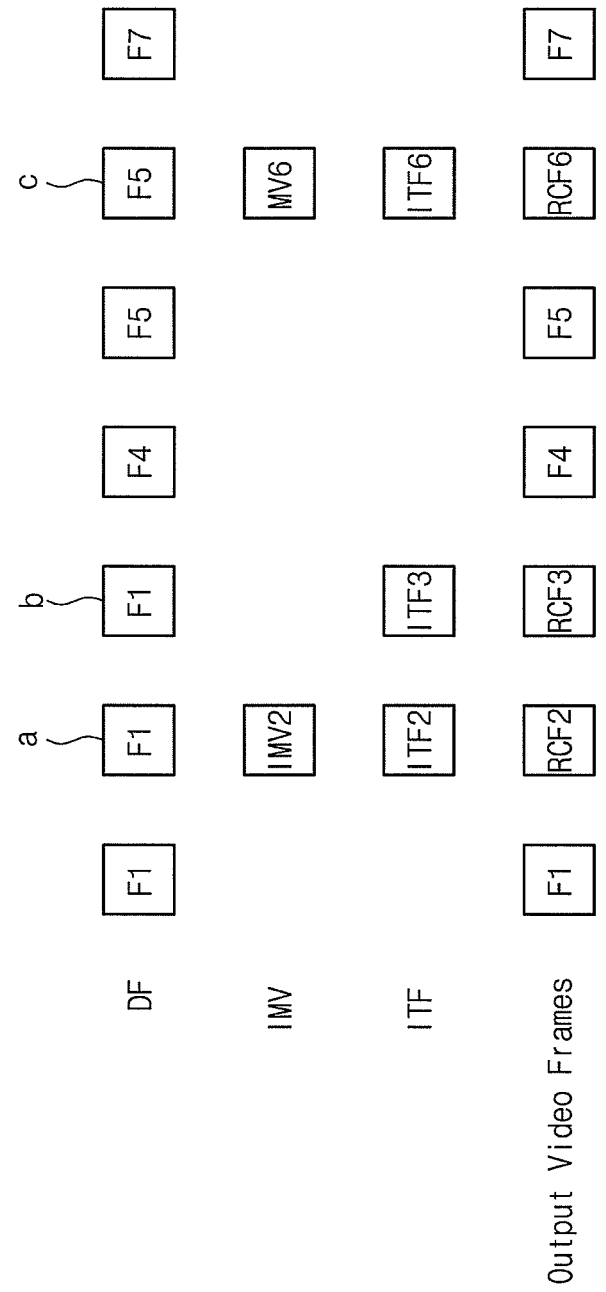
FIG. 10 is a diagram showing video frames outputted from the second internal buffer 2 of FIG. 1.

When the motion vector information IMV is not received and the target frame information ITF is received, the receiving unit 410 may select the first and third video frames F1 and F3 as reference frames RF according to a given algorithm. The receiving unit 410 then transfers the first and third video frames F1 and F3 to the sub-frame generating unit 420. At this time, the sub-frame SF and the recovered frame RCF may be identical to each other. The internal buffer controlling unit 440 stores the recovered frame RCF in the second internal buffer 123 according to the target frame information ITF. As described in FIG. 6, a video frame encoding transmitter 110 may encode a replace frame instead of the second video frame F2 as a target frame. The target frame information ITF may indicate a replace frame among decoded video frames DF. The replace frame may be a frame stored in the second internal buffer 123. The internal buffer controlling unit 440 may replace the replace frame in the second internal buffer 123 with the recovered frame RCF according to the target frame information ITF. The receiving frame rate controller 122 may generate the recovered frame RCF using the motion vector information IMV. The replace frame may be replaced with the recovered frame RCF, and the recovered frame RCF may be included in video frames outputted from the bit stream decoding receiver 120. FIG. 10 is a diagram showing video frames outputted from the second internal buffer 2 123. In FIG. 10, there is exemplarily illustrated the case that encoded data described in FIG. 6 is decoded. Referring to FIGS. 1, 9, and 10, the receiving frame rate controller 122 does not receive motion vector information and target frame information associated with the first video frame F1. The receiving frame rate controller 122 does not generate a recovered frame for the first video frame F1. Thus, the first video frame F1 as-received may constitute one of the output video frames of the second internal buffer 2 123.

The receiving frame rate controller 122 receives the second motion vector information IMV2 and the second target frame information ITF2 related to the original second video frame F2. The receiving frame rate controller 122 generates the second recovered frame RCF2 using the second motion vector information IMV2. The receiving frame rate controller 122 store the second recovered frame RCF2 at an area corresponding to the second target frame information ITF2 of the second internal buffer 123. Thus, a replace frame (a) stored in the second internal buffer 123 may be replaced with the second recovered frame RCF2. Thus, the second recovered frame RCF2 may constitute one of video frames outputted from the second internal buffer 123.

The receiving frame rate controller 122 may receive the third target frame information ITF. The receiving frame rate controller 122 generates the third recovered frame RCF3. A replace frame (b) stored in the second internal buffer 123 may be replaced with the third recovered frame RCF3. The third recovered frame RCF3 may constitute one of video frames outputted from the second internal buffer 123.

The receiving frame rate controller 122 may receive the sixth motion vector information IMV6 and the sixth target frame information ITF6. A replace frame (c) stored in the second internal buffer 123 may be replaced with the sixth recovered frame RCF6. The sixth recovered frame RCF6 may constitute one of video frames outputted from the second internal buffer 123.

FIG. 11 is a flowchart of an operating method of the bit stream encoding transmitter 120 in FIG. 1. Referring to FIGS. 1, 9, and 11, in step S310, bit stream BS is received from a video frame encoding transmitter 110. In step S320, the decoder 121 decodes the bit stream BS to generate decoded video frames DF, motion vector information IMV, and target frame information ITF.

In step S330, a receiving frame rate controller 122 may generate a recovered frame RCF using the first and third video frames F1 and F3 (e.g., reference frames) and the motion vector information IMV. In step S340, the recovered frame RCF may be stored in the second internal buffer 123.

In accordance with an exemplary embodiment of the inventive concept, a transmitting frame rate controller 111 may have previously generated a temporary frame TPF corresponding to a sub-frame SF to be generated within a receiving frame rate controller 122 and thus compared the temporary frame TPF with a target frame TF. Supplying of the motion vector information IMV may be determined according to the comparison.

The transmitting frame rate controller 111 according to an exemplary embodiment of the inventive concept may provide motion vector information IMV corresponding to a target frame TF. The encoder 112 may encode the motion vector information IMV and produce a replace frame for replacing the target frame TF. Accordingly, it is possible to reduce the data amount of the bit stream BS generated aby video frame encoding transmitter 110.

The receiving frame rate controller 121 according to an exemplary embodiment of the inventive concept may generate a recovered frame RCF using motion vector information IMV. Accordingly, it is possible to improve the reliability of image information included in output video frames of a bit stream decoding receiver 120. The above-disclosed subject matter is to be considered illustrative, and not restrictive, and the appended claims are intended to cover all such modifications, enhancements, and other embodiments, which fall within the true spirit and scope. Thus, to the maximum extent allowed by law, the scope is to be determined by the broadest permissible interpretation of the following claims and their equivalents, and shall not be restricted or limited by the foregoing detailed description.

What is claimed is:

1. An encoding method comprising:
    receiving a plurality of video frames including reference frames and a target frame;
    generating a temporary frame from the reference frames, wherein the temporary frame is generated according to motion information of a moving object included in the reference frames;
    comparing the temporary frame with the target frame to provide motion vector information between the target frame and at least one of the reference frames based on the comparison; and
    encoding the reference frames and the motion vector information.

2. The encoding method of claim 1, wherein the comparing the temporary frame with the target frame comprises comparing image data of the temporary frame and image data of the target frame macro block by macro block.

3. The encoding method of claim 2, wherein the comparing the temporary frame with the target frame comprises determining whether to provide the motion vector information.

4. The encoding method of claim 1, wherein the temporary frame is generated by estimating image data of the target frame based on interpolation of motion vectors between a first and a third reference frames.

5. The encoding method of claim 1, wherein each of the temporary frame and the target frame comprises a plurality of macro blocks, and
    wherein the comparing the temporary frame with the target frame comprises:
    detecting at least one nonlinear macro blocks of the target frame by comparing macro blocks of the temporary frame with spatially corresponding macro blocks of the target frame.

6. The encoding method of claim 5, wherein the temporary frame is generated macro block by macro block, and
    wherein the comparing the temporary frame with the target frame comprises, when each macro block of the temporary frame is generated, detecting a nonlinear macro block of the target frame by comparing a macro block of the temporary frame and a spatially corresponding macro block of the target frame.

7. The encoding method of claim 5, wherein the comparing the temporary frame with the target frame comprises:
    providing the motion vector information between the detected nonlinear macro block of the target frame and a macro block in at least one of the reference frames.

8. The encoding method of claim 5, wherein the motion vector information is provided when the number of the detected nonlinear macro blocks is below a predetermined number.

9. The encoding method of claim 1, wherein the encoding comprises:
    encoding a replace frame replacing the target frame and encoding the reference frames and the motion vector information.

10. The encoding method of claim 9, wherein the replace frame has image data being identical to one of the reference frames.

11. A video frame encoding device comprising:
    a frame rate controller configured to receive video frames including first and third reference frames and a target frame and to provide motion vector information between the target frame and at least one of the reference frames; and
    an encoder configured to encode the video frames or to encode the first and third reference frames and the motion vector information when the motion vector information is provided,
    wherein the frame rate controller is further configured to determine whether to supply the motion vector information by:
        generating a temporary frame based on motion information of objects moving between the first and third reference frames;
        and comparing the temporary frame and the target frame.

12. The video frame encoding device of claim 11, wherein the frame rate controller comprises:
    a comparing unit configured to detect macro blocks of the target frame by comparing image data of the temporary frame and image data of the target frame macro block by macro block.

13. The video frame encoding device of claim 12, wherein the frame rate controller further comprises:
    a temporary frame generating unit configured to generate the temporary frame macro block by macro block using motion vectors between macro blocks in the first and third reference frames and to transfer the generated macro blocks to the comparing unit.

14. The video frame encoding device of claim 12, wherein the comparing unit generates macro block information including position information of the detected nonlinear macro blocks.

15. The video frame encoding device of claim 14, wherein the frame rate controller further comprises:
    a motion vector calculating unit configured to generate the motion vector information between nonlinear macro blocks of the target frame corresponding to the position information and macro blocks in at least one of the reference frames.

16. The video frame encoding device of claim 11, wherein the frame rate controller transfers target frame information together with the motion vector information, and
    wherein the encoder receives the video frames, divides the video frames into the first and third reference frames and the target frame according to the target frame information, and encodes a replace frame for replacing the target frame together with the motion vector information.

17. An encoding method comprising:
receiving a plurality of video frames including first and third reference frames and a target frame;
generating a temporary frame from the reference frames, wherein the temporary frame is generated according to motion information of a moving object included in the reference frames;
comparing the temporary frame with the target frame to provide motion vector information between the target frame and at least one of the first and third reference frames based on the comparison; and
encoding the reference flames and the motion vector information.

18. The encoding method of claim 17, wherein the comparing the temporary frame with the target frame comprises comparing image data of the temporary frame and image data of the target frame macro block by macro block.

19. The encoding method of claim 18, wherein the comparing the temporary frame with the target frame comprises determining whether to provide the motion vector information.

20. The encoding method of claim 17, wherein the temporary frame is generated by estimating image data of the target frame based on interpolation of motion vectors between a first and a third reference frames.

\* \* \* \* \*